L. R. ALLEN.
WAGON BRAKE.
APPLICATION FILED JULY 10, 1913.
1,153,745.
Patented Sept. 14, 1915.
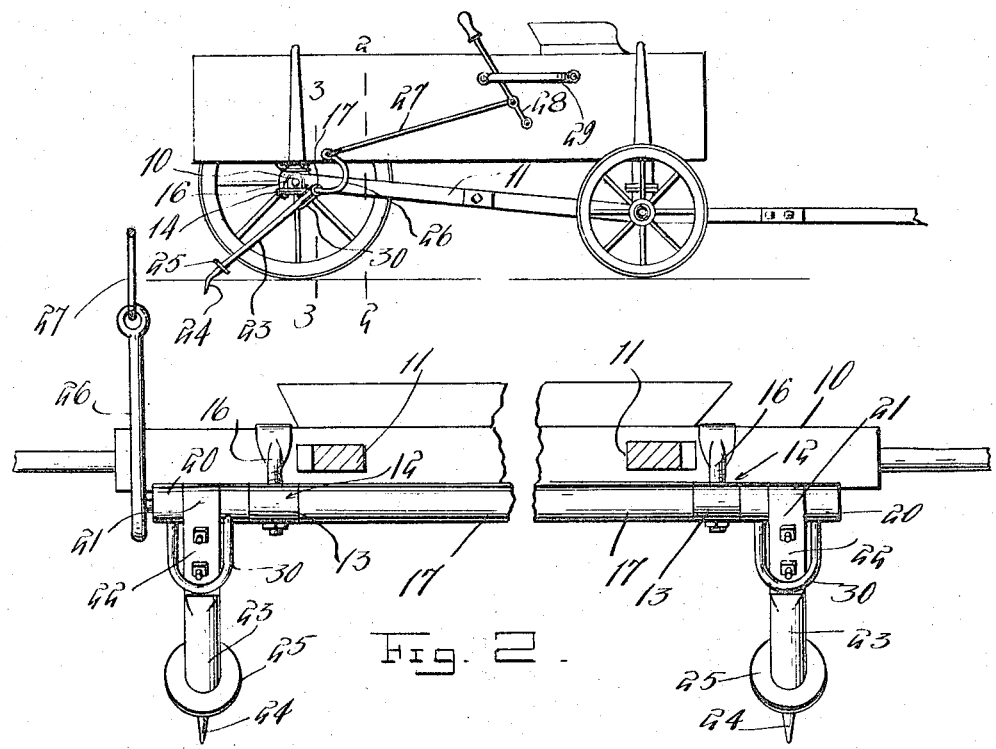
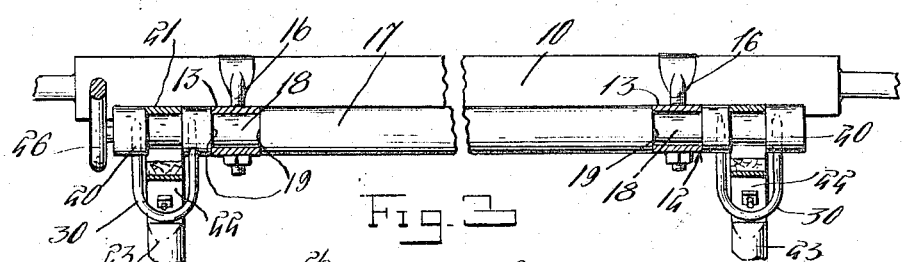
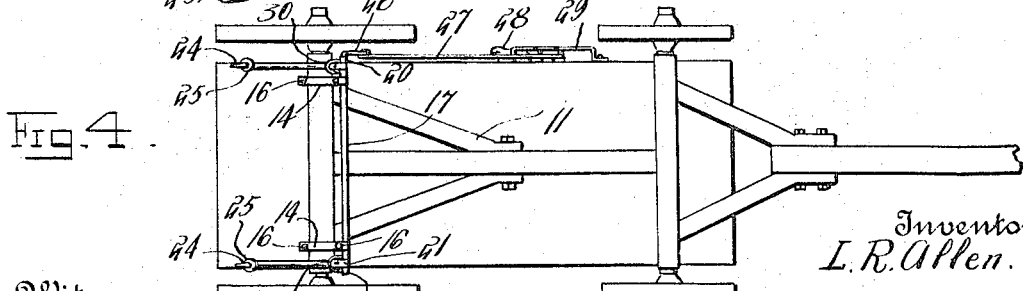
Witnesses
J. C. Simpson
Harry M. Test
Inventor
L. R. Allen.
By
Attorneys

UNITED STATES PATENT OFFICE.

LOUIS R. ALLEN, OF SPARKS, NEBRASKA.

WAGON-BRAKE.

1,153,745.    Specification of Letters Patent.    Patented Sept. 14, 1915.

Application filed July 10, 1913. Serial No. 778,348.

*To all whom it may concern:*

Be it known that I, LOUIS R. ALLEN, a citizen of the United States, residing at Sparks, in the county of Cherry, State of Nebraska, have invented certain new and useful Improvements in Wagon-Brakes; and I do hereby declare the following to be a full, clear, and exact description of the invention, such as will enable others skilled in the art to which it appertains to make and use the same.

This invention relates to improvements in wagon brakes and particularly to drag brakes.

The principal object is to provide a simple device of this character which can be quickly and easily moved into and out of operation from the driver's seat.

Another object resides in the peculiar construction and arrangement of the various parts and the manner of attaching the same to a vehicle.

Other objects and advantages will be apparent from the following description when taken in connection with the accompanying drawings.

In the drawings: Figure 1 is a side elevation of a wagon showing my device in operative position. Fig. 2 is a vertical section on the line 2—2 of Fig. 1. Fig. 3 is a vertical section on the line 3—3 of Fig. 1, slightly enlarged. Fig. 4 is a bottom plan view.

Referring particularly to the accompanying drawings, 10 represents the rear axle of the wagon, and 11 the hound thereof. Secured to the axle adjacent the ends are the bearings 12, these bearings each consisting of a metal plate comprising the tubular portion 13 and the flat end portions 14, the latter of which are provided with openings to receive the ends of a U-bolt 16 which straddles the axle. Rotatably mounted in the tubular portions 13 of the bearings 12, and arranged forwardly of the axle, is a shaft 17, this shaft being slightly reduced as at 18 where it is journaled in the tubular members 13. Thus the shoulders 19 are produced which prevent longitudinal movement of the shaft in the bearings. On the ends of the shaft are the heads 20, and mounted on each end of the shaft inwardly of the head is a clip 21, the arms 22 of which are secured to a downwardly and rearwardly extending pole 23. In the end of each of the poles 23 is a downwardly bent sharpened pin or spike 24 for engagement in the ground in the operation of the device, as will be further set forth. Secured to the end of the pole is a disk 25, this disk being provided to prevent the pole being driven too deep into the ground.

Rigidly secured to one end of the shaft 17 is a curved arm 26, this arm having attached to one end a link 27, connected at its other end above the pivoted lower end of an operating lever 28. This lever 28 is pivotally mounted on the side of the wagon adjacent the brake lever and is arranged to be engaged in a notched segment 29.

Secured to each end of the shaft 17 and extending rearwardly under each of the poles 23 is a loop 30, the purpose of which will be further set forth.

The device is particularly adapted for preventing a wagon backing when the vehicle is brought to a stop on a hill to rest the horses, or for any other purpose. By movement of the lever 28, the shaft 17 can be rotated to permit the poles 23 to fall to the ground, and should the wagon back slightly, the points 27 will be driven into the ground, and thus check any further movement of the vehicle. To raise the poles from the ground, the lever 28 is moved in the opposite direction, in which movement the loops 30 engage under the poles and lift them to the proper height. One of the poles 23 can be arranged to drop lower than the other one if desired, by arranging one of the loops 30 farther around the shaft.

It will of course be understood, that the poles are of sufficient length to prevent the wagon backing over them.

What is claimed is:

An auxiliary brake for a wagon comprising a transversely disposed shaft, each end of which is formed with a plurality of peripheral reduced portions, shaft supporting clips embracing certain of the reduced portions, clips engaged in certain others of the reduced portions, road engaging poles secured to the last-named clips, means for rotating the shaft within the clips, and U-shaped members having their ends secured to the shaft at opposite sides of certain of the clips with their bight portions disposed below and in engagement with the under sides of the poles.

In testimony whereof, I affix my signature, in the presence of two witnesses.

LOUIS R. ALLEN.

Witnesses:
W. E. HALEY,
ELIZABETH BUSH.